(12) United States Patent
Ebrahimi et al.

(10) Patent No.: US 10,678,610 B2
(45) Date of Patent: Jun. 9, 2020

(54) USING AND UPDATING TOPOLOGICAL RELATIONSHIPS AMONGST A SET OF NODES IN EVENT CLUSTERING

(71) Applicant: Oracle International Corporation, Redwood Shores, CA (US)

(72) Inventors: Mohammad Sadegh Ebrahimi, Sunnyvale, CA (US); Raghu Hanumanth Reddy Patti, San Bruno, CA (US); Dustin Garvey, Exeter, NH (US)

(73) Assignee: Oracle International Corporation, Redwood Shores, CA (US)

( * ) Notice: Subject to any disclaimer, the term of this patent is extended or adjusted under 35 U.S.C. 154(b) by 297 days.

(21) Appl. No.: 15/950,987

(22) Filed: Apr. 11, 2018

(65) Prior Publication Data

US 2019/0317834 A1    Oct. 17, 2019

(51) Int. Cl.
*G06F 9/54* (2006.01)
*G06F 11/30* (2006.01)
*G06F 17/18* (2006.01)

(52) U.S. Cl.
CPC .......... *G06F 9/542* (2013.01); *G06F 11/3006* (2013.01); *G06F 17/18* (2013.01)

(58) Field of Classification Search
CPC ...................................................... G06F 9/542
USPC ........................................................ 719/318
See application file for complete search history.

(56) References Cited

U.S. PATENT DOCUMENTS

2019/0034517 A1* 1/2019 Byrd ....................... G06F 17/40
2019/0235978 A1* 8/2019 Wu ...................... G06F 11/2023

OTHER PUBLICATIONS

Xue, What is Algorithmic Alert Correlation?, Big Panda blog, Oct. 12, 2017.
Gruschke, Boris. (1999). Integrated Event Management: Event Correlation Using Dependency Graphs. Distributed Systems Operations Management.

* cited by examiner

*Primary Examiner* — Andy Ho
(74) *Attorney, Agent, or Firm* — Invoke

(57) ABSTRACT

Using and updating topological relationships amongst a set of nodes in event clustering is disclosed. A current event occurs on a current node. A first cluster of related events includes a first event, occurring on a first node, that is time-correlated with the current event. The first cluster does not include any event that is topologically-correlated with the current event based on the existing set of topological relationships. A level of interdependence is determined between (a) occurrence of events on the current node and (b) occurrence of events on the first node. Based on the level of interdependence, the current event is added to the first cluster. Further, an event-based topological relationship between the first node and the second node is added to the set of topological relationships. Subsequently, clustering for new events may be determined based on the event-based topological relationship between the first node and the second node.

20 Claims, 7 Drawing Sheets

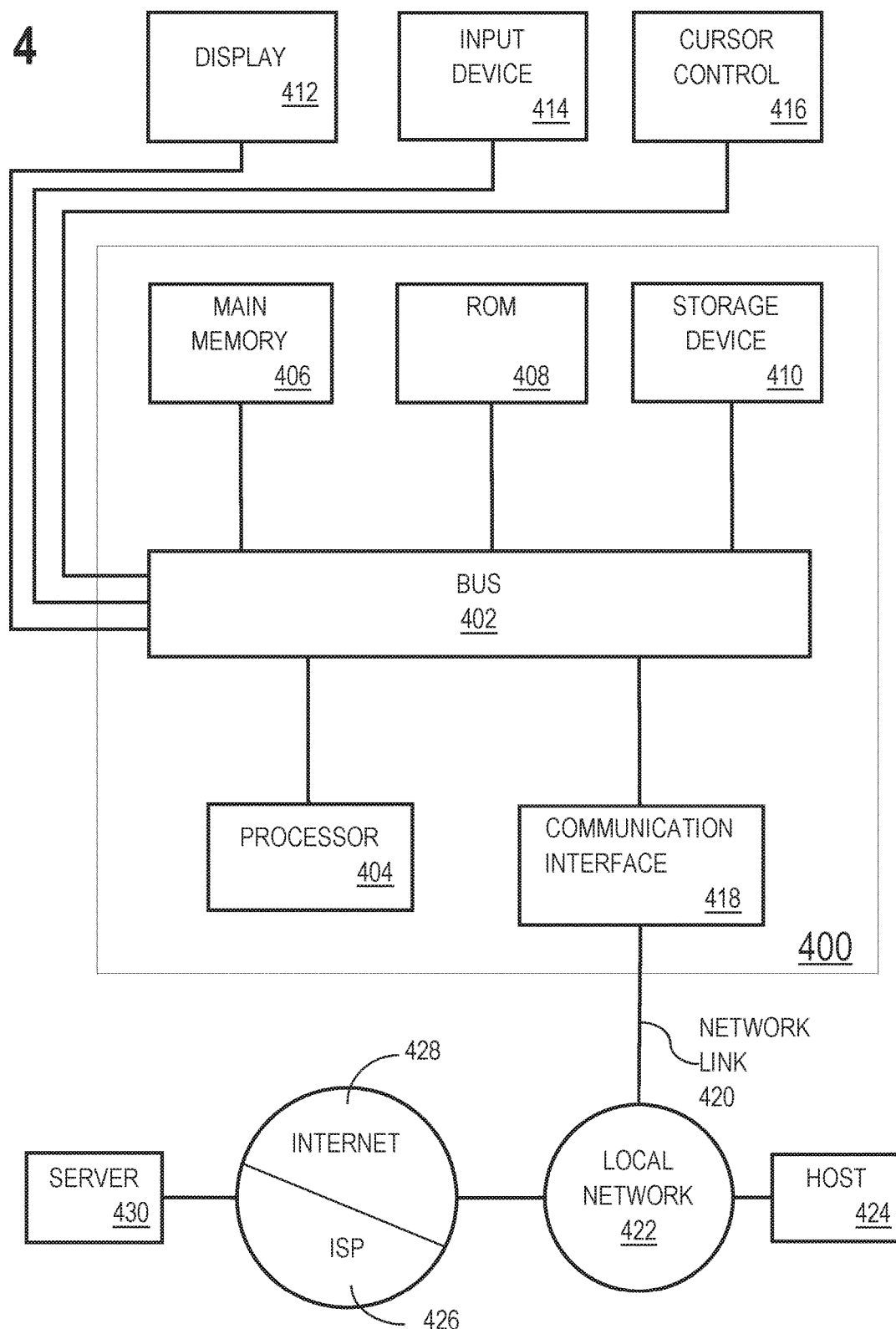

USING AND UPDATING TOPOLOGICAL RELATIONSHIPS AMONGST A SET OF NODES IN EVENT CLUSTERING

TECHNICAL FIELD

The present disclosure relates to clustering events associated with nodes of a computing system. In particular, the present disclosure relates to using and updating topological relationships amongst a set of nodes in event clustering.

BACKGROUND

A computing system includes various nodes. A "node" refers to any hardware and/or software component, such as a physical machine, a virtual machine, an operating system, a firmware program, a middleware program, an application, a web service, and/or a software service.

Each node is associated with various metrics. A "metric" refers to a measurement of a particular characteristic of a node's performance or efficiency. Examples of metrics include availability, response time, capacity, load, latency, completion time, service time, bandwidth, throughput, relative efficiency, scalability, performance per watt, compression ratio, instruction path length and speed up, process time (or central processing unit (CPU) time), idle time, input/output (I/O) time, reliability, time between failure, time to repair, frequency of security threats, and/or severity of security threats.

An event occurs on a node when a metric associated with the node meets a certain criteria. A notification of the event is generated, so that an engineer and/or an external application may analyze, resolve, and/or process the event.

In a complex computing system, the frequency of events may be very high. It would be highly burdensome to process each event individually. Moreover, multiple events may stem from the same cause. It would be inefficient to process each event without regard to the related events.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 4 shows a block diagram that illustrates a computer system in accordance with one or more embodiments.

DETAILED DESCRIPTION

Figure 1A:
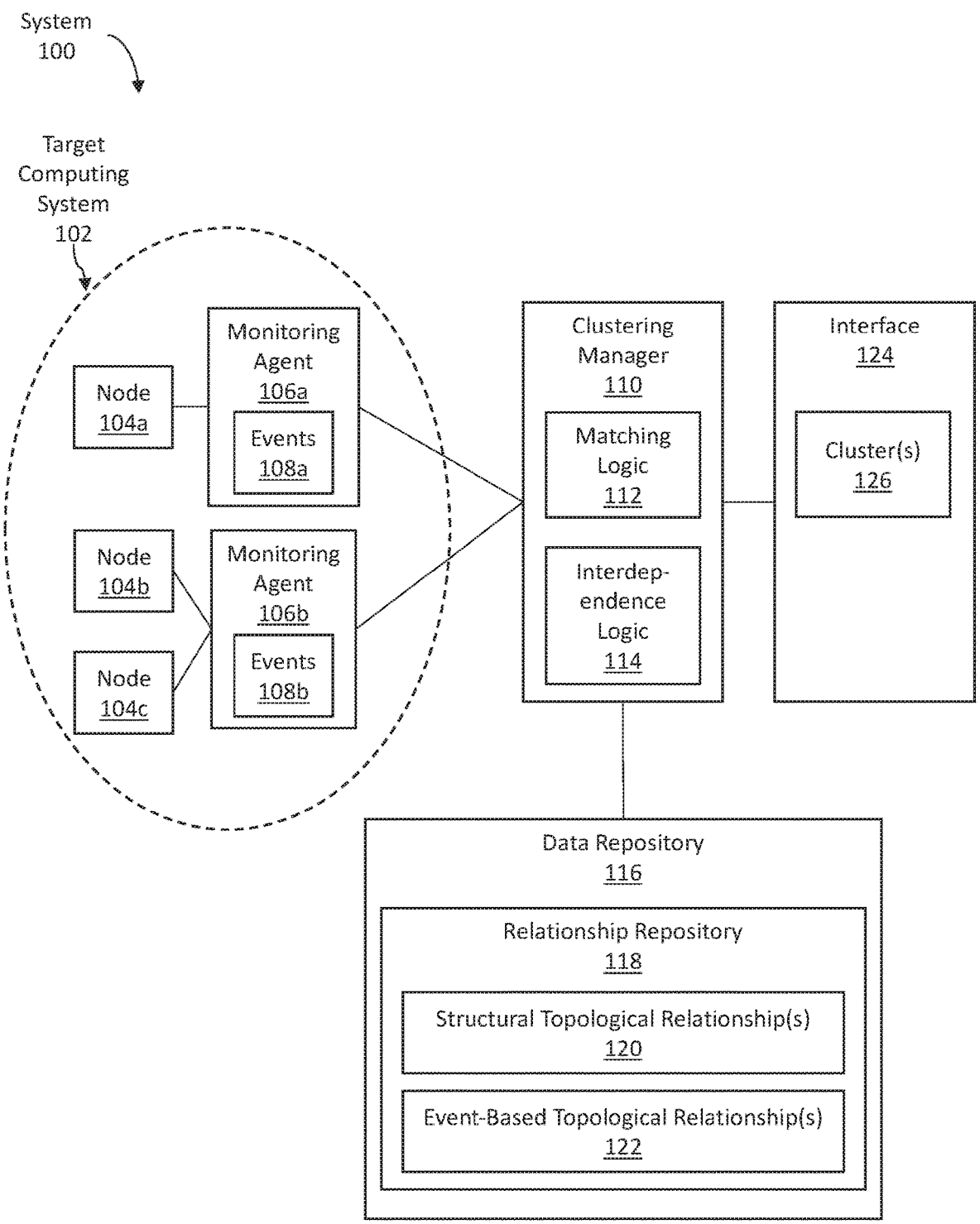
FIG. 1A illustrates a clustering feedback system, in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. CLUSTERING FEEDBACK SYSTEM ARCHITECTURE
3. USING AND UPDATING TOPOLOGICAL RELATIONSHIPS AMONGST A SET OF NODES IN EVENT CLUSTERING
4. EXAMPLE EMBODIMENT
5. HARDWARE OVERVIEW
6. MISCELLANEOUS; EXTENSIONS

1. General Overview

One or more embodiments include using and updating topological relationships amongst a set of nodes in event clustering. An existing set of topological relationships amongst a set of nodes in a computing system is identified. A topological relationship between particular nodes indicates that the particular nodes are related to each other in the way that the particular nodes operate together in the computing system. The existing set of topological relationships is used to identify a first cluster of related events.

A second event occurs on a second node. The second event is time-correlated with a first event, occurring on a first node, within the first cluster of related events. However, based on the existing set of topological relationships, the second event is not topologically-correlated with any event within the first cluster of related events.

A level of interdependence is determined between (a) occurrence of events on the first node and (b) occurrence of events on the second node. Based on the level of interdependence, the second event is added to the first cluster. Further, an event-based topological relationship between the first node and the second node is determined. The set of topological relationships amongst the set of nodes is updated to include the event-based topological relationship between the first node and the second node.

Subsequently, a third event occurs on the first node, and a fourth event occurs on the second node. Based on the event-based topological relationship between the first node and the second node, the third event and the fourth event are clustered into the same cluster.

Whereas processing of events individually may lead to inefficiencies and redundancies, clustering related events allows the related events to be analyzed, resolved, and/or processed as a group. Clustering events thus improves the processing of the events.

However, clustering events based on a static set of topological relationships may lead to inaccurate clustering. Specifically a static set of topological relationships may miss a particular topological relationship between a first node and a second node. A first event, occurring on the first node, that is actually related to a second event, occurring on the second node, may be erroneously classified as being not related. The first event would be in a first cluster, and the second event would be in a separate second cluster. The first cluster and the second cluster would be analyzed separately, whereas analyzing the two clusters together would be more efficient. Based on the techniques described herein, event information is used to update a set of topological relationships between a set of nodes. Specifically, based on event co-occurrence and interdependency, an event-based topological relationship between a first node and a second node is added to the set of topological relationships. Thereafter, based on the newly added event-based topological relationship between the first node and the second node, events occurring on the first node and the second node may be determined to be in the same cluster and hence analyzed together.

One or more embodiments described in this Specification and/or recited in the claims may not be included in this General Overview section.

2. Clustering Feedback System Architecture

FIG. 1 illustrates a clustering feedback system, in accordance with one or more embodiments. As illustrated in FIG. 1, a system 100 includes a target computing system 102, which includes nodes 104a-c and monitoring agents 106a-b. The system 100 further includes a clustering manager 110, a data repository 116, and an interface 124. In one or more embodiments, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

In one or more embodiments, a target computing system 102 is a computing system that is being analyzed. Events occurring on nodes 104a-c in the target computing system 102 are analyzed for any problems that may be occurring within the target computing system 102.

In one or more embodiments, a node (such as any of nodes 104a-c) refers to any hardware and/or software component within a target computing system 102. Examples of nodes include a physical machine, a virtual machine, an operating system, a firmware program, a middleware program, an application, a web service, and/or a software service.

In one or more embodiments, a monitoring agent (such as any of monitoring agents 106a-b) refers to software and/or hardware configured to monitor metrics and/or events associated with one or more nodes 104a-c. The monitoring agent generates notifications relating to metrics and/or events associated with the nodes 104a-c. As illustrated, monitoring agent 106a monitors metrics and/or events of node 104a. Monitoring agent 106b monitors metrics and/or events of node 104b and node 104c. A monitoring agent may be a separate component from the node being monitored. Alternatively, a monitoring agent may be a component within the node being monitored.

A metric of a node refers to a measurement of a particular characteristic of the node's performance or efficiency. Examples of metrics include availability, response time, capacity, load, latency, completion time, service time, bandwidth, throughput, relative efficiency, scalability, performance per watt, compression ratio, instruction path length and speed up, process time (or central processing unit (CPU) time), idle time, input/output (I/O) time, reliability, time between failure, time to repair, frequency of security threats, and/or severity of security threats.

An event (such as events 108a-b) occurs on a node when a metric associated with the node meets a certain criteria. As an example, an event may occur when an availability of a node falls below a threshold value. As another example, an event may occur when a response time of a node exceeds a threshold value. As another example, an event may occur when a security threat of a particular type is detected. As illustrated, monitoring agent 106a determines that events 108a have occurred. Monitoring agent 106b determines that events 108b have occurred.

In one or more embodiments, a data repository 116 is any type of storage unit and/or device (e.g., a file system, database, collection of tables, or any other storage mechanism) for storing data. Further, a data repository 116 may include multiple different storage units and/or devices. The multiple different storage units and/or devices may or may not be of the same type or located at the same physical site. Further, a data repository 116 may be implemented or may execute on the same computing system as a clustering manager 110. Alternatively or additionally, a data repository 116 may be implemented or executed on a computing system separate from a clustering manager 110. The data repository 116 may be communicatively coupled to the clustering manager 110 via a direct connection or via a network.

Information describing a relationship repository 118 may be implemented across any of components within the system 100. However, this information is illustrated within the data repository 116 for purposes of clarity and explanation.

In one or more embodiments, a relationship repository 118 refers to information indicating topological relationships between a set of nodes 104a-c in a target computing system 102. A topological relationship between particular nodes indicates that the particular nodes are related to each other in the way that the particular nodes operate together in the computing system. Various types of topological relationships may be included. The relationship repository 118 indicates an overall architecture and/or arrangement of the nodes 104a-c.

In an embodiment, a structural topological relationship 120 is a topological relationship that is determined based on analyzing code, files, and/or operation of a target computing environment 102.

A set of code to be executed by one or more nodes of a target computing environment 102 may indicate various types of structural topological relationships 120. For example, a set of code may indicate which node is configured to call operations of another node, which node is configured to provide inputs to another node, which node is configured to receive outputs of another node, which node is configured to import code and/or data from another node, and/or which node is configured to communicate with another node.

Files of a target computing environment 102 may include, for example, a configuration file, deployment file, and/or other written information associated with a target computing environment 102. A file of a target computing environment 102 may indicate which node depends on and/or relates to another node. A file of a target computing environment 102 may include user input indicating a topological relationship between nodes. The user input may indicate that a particular node depends on and/or relates to another node.

An operation of a target computing environment 102 may be determined by monitoring the target computing environment 102. The network traffic associated with the target computing environment 102 may be monitored. Additionally or alternatively, functions, methods, and/or steps executed by the target computing environment 102 may be monitored. The operation of the target computing environment 102 may indicate which node calls operations of another node, which node provides inputs to another node, which node receives outputs of another node, which node imports code and/or data from another node, and/or which node communicates with another node.

Examples of structural topological relationships 120 include but are not limited to a particular node that uses another node, a particular node that is used by another node, a particular node that is stored and/or executed on another node, a particular node that communicates with another node. A structural topological relationship 120 may be unidirectional (one-way dependency) or bidirectional (two-way dependency). A structural topological relationship 120 may be storage-related, input/output (I/O) related, central processing unit (CPU) related, storage related and/or application related.

As an example, a first node may execute a first set of code. The first set of code may include an operation that depends on an operation of a second node. Based on the first set of code, a structural topological relationship may be determined to exist between the first node and the second node. Meanwhile, the second node may execute a second set of code. The second set of code may include an operation that depends on an operation of the first node. Based on the first set of code and the second set of code, a bidirectional structural topological relationship may be determined to exist between the first node and the second node.

As another example, a first node may be associated with a particular configuration file. The particular configuration file may indicate that the first node imports code executing on a second node. Based on the particular configuration file, a structural topological relationship may be determined to exist between the first node and the second node.

As another example, a computing system may be deployed based on a deployment file. The deployment file may indicate that instantiation of a first node requires instantiation of a second node. Based on the deployment file, a structural topological relationship may be determined to exist between the first node and the second node.

As another example, a particular application may execute on a particular virtual machine, which executes on a particular server. Based on the software stack, structural topological relationships may be determined to exist between the particular application, the particular virtual machine, and the particular server. In particular, there is one hop between the particular application and the particular virtual machine. There is one hop between the particular virtual machine and the particular server. There are two hops between the particular application and the particular server.

As another example, network traffic associated with an application may be intercepted. The monitored traffic may indicate that the application transmitted a particular packet to a database server. The particular packet may include data to be written to the database server. Based on the network traffic, a structural topological relationship may be determined to exist between the application and the database server. Further, since the packet transmitted from the application to the database server includes data to be written to the database server, the structural topological relationship is storage related.

In an embodiment, an event-based topological relationship 122 is a topological relationship that is determined based on event information. Operations for determining an event-based topological relationship 122 are described below with reference to FIGS. 2A-B.

Figure 1B:
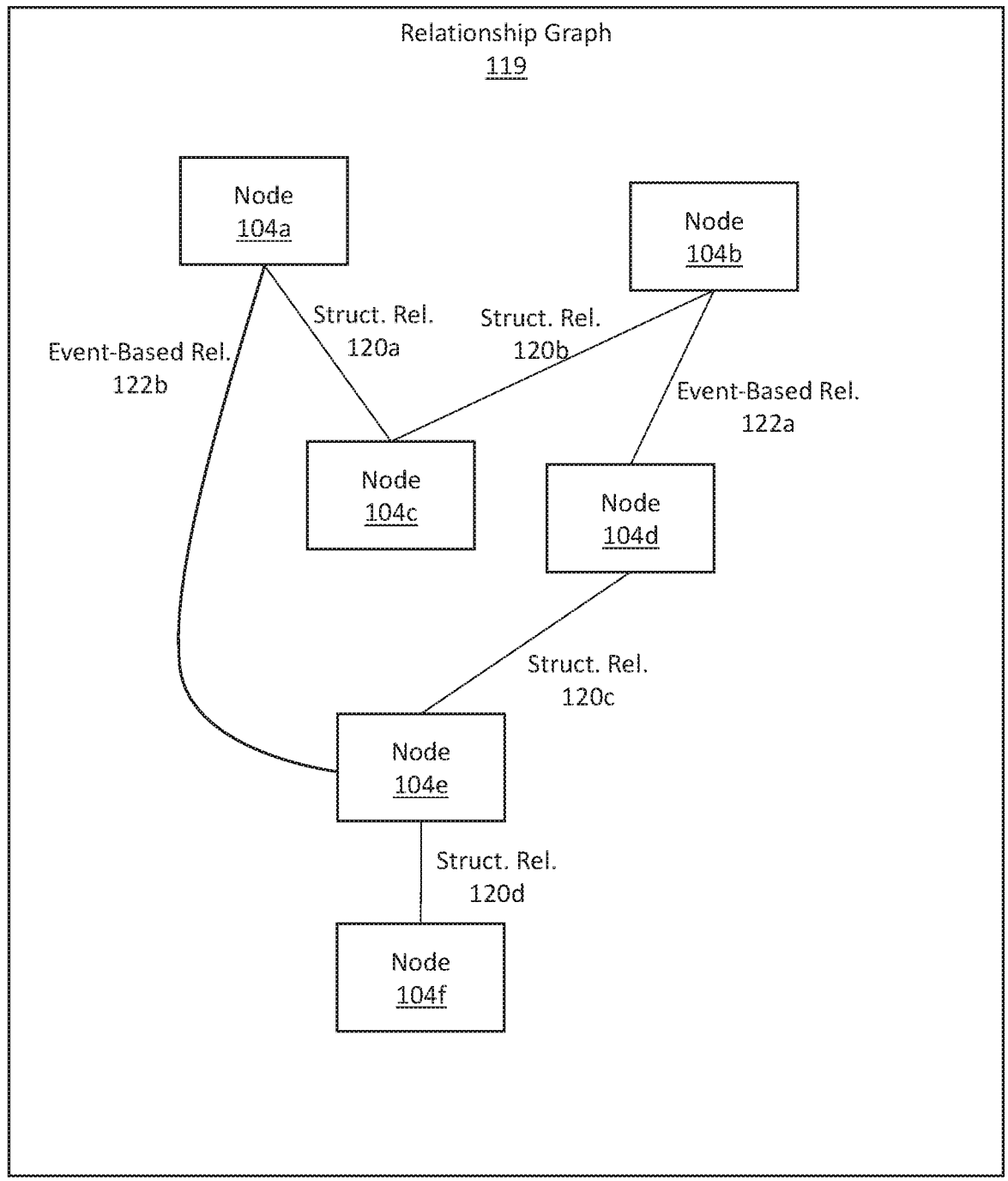
FIG. 1B illustrates an example relationship graph indicating topological relationships amongst a set of nodes of a target computing system, in accordance with one or more embodiments.

A relationship repository 118 may store relationship information in various forms, such as a relationship graph, and/or a relationship table. FIG. 1B illustrates an example relationship graph indicating topological relationships amongst a set of nodes of a target computing system, in accordance with one or more embodiments. As illustrated, a relationship graph 119 includes nodes 104*a-f*. A structural topological relationship 120*a* exists between node 104*a* and node 104*c*. A structural topological relationship 120*b* exists between node 104*b* and node 104*c*. A structural topological relationship 120*c* exists between node 104*d* and node 104*e*. A structural topological relationship 120*d* exists between node 104*e* and node 104*f*. An event-based topological relationship 122*a* exists between node 104*b* and node 104*d*. An event-based topological relationship 122*b* exists between node 104*a* and node 104*e*.

A "hop" between a first node and a second node represents a distance between the first node and the second node as indicated by a relationship repository 118. Using the relationship graph 119 as an example, there is a direct topological relationships (event-based topological relationship 122*a*) between node 104*b* and node 104*d*. Hence, node 104*b* and node 104*d* are referred to as being "one hop" away from each other. Meanwhile, there is no direct topological relationship between node 104*b* and node 104*e*. However, there is a direct topological relationships (event-based topological relationship 122*a*) between node 104*b* and node 104*d*. And there is a direct topological relationships (structural topological relationship 120*c*) between node 104*d* and node 104*e*. Hence, node 104*b* and node 104*e* are referred to as being "two hops" away from each other. Similarly, node 104*b* and node 104*e* are referred to as being "three hops" away from each other.

Referring back to FIG. 1A, in one or more embodiments, a clustering manager 110 refers to hardware and/or software configured to perform operations described herein for using and updating topological relationships amongst a set of nodes in event clustering. Examples of operations for using and updating topological relationships amongst a set of nodes in event clustering are described below with reference to FIGS. 2A-B.

A clustering manager 110 may include matching logic 112 and interdependence logic 114. Matching logic 112 may be configured to cluster events based on an existing set of topological relationships in a relationship repository 118. Interdependence logic 114 may be configured to update a set of topological relationships in a relationship repository 118 based on event information. Matching logic 112 and interdependence logic 114 may be implemented in separate modules or components from each other. Alternatively, matching logic 112 and interdependence logic 114 may be implemented within the same module or component.

In an embodiment, a clustering manager 110 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a mainframe, a television, a content receiver, a set-top box, a printer, a mobile handset, a smartphone, a personal digital assistant (PDA).

In one or more embodiments, an interface 124 refers to hardware and/or software configured to facilitate communications to and/or from a clustering manager 110. In an embodiment, an interface 124 may include a user interface, an application interface, or both.

In an embodiment, an interface 124 is a user interface configured to facilitate communications between a clustering manager 110 and a user. A user interface outputs information in the form of user interface elements, and/or receives input of information via user interface elements. Examples of user interfaces include a graphical user interface (GUI), a command line interface (CLI), a haptic interface, and a voice command interface. Examples of user interface elements include text, graphic, checkboxes, radio buttons, dropdown lists, list boxes, buttons, toggles, text fields, date and time selectors, command lines, sliders, pages, and forms.

In an embodiment, an interface 124 is an application interface configured to facilitate communications between a clustering manager 110 and one or more applications. An application interface (such as an application programming interface (API)) may facilitate communications based on one or more communications protocols, such as Hypertext Transfer Protocol (HTTP). A communication protocol may conform with a Representational State Transfer (REST) architectural style.

Information describing clusters 126 may be implemented across any of components within the system 100. However, this information is illustrated within the interface 124 for purposes of clarity and explanation.

In one or more embodiments, a cluster 126 is a set of one or more related events. The set of events may be related in various ways.

In an embodiment, a cluster 126 is a set of events that are related such that the set of events should be processed together. A user and/or application that receives a cluster 126 via an interface 124 processes a set of events included the cluster as a group. The user and/or application processes the set of events more efficiently as a group, rather than individually.

In an embodiment, a cluster 126 includes a first event and a second event that are related such that resolving the first event necessarily results in resolving a second event. The first event and the second event are more efficiently processed if considered as a group. When the first event is marked as resolved, the second event may automatically be marked as also resolved. As an example, a computing system may include a database node and an application node. The application node may access information from the database node, and thereby depends on the database node. Due to an error on the database node, the application node may not be able to access information from the database node. Hence, an event may be detected on each of the database node and the application node. The event on the database node may be resolved. Then the application node may be able to access information from the database node again. Hence, in this example, resolving the event on the database node necessarily resolves the event on the application node. The event on the database node and the event on the application node may be grouped in the same cluster.

In an embodiment, a cluster 126 includes two events that are related such that only one of the two events needs to be analyzed when analyzing a performance and/or error of a target computing system 102. The events are processed more efficiently when grouped into a cluster 126 because only one of the events is selected for the analysis. The remaining events need not be analyzed. As an example, a computing system may include a database node and an application node. The application node may access information from the database node, and thereby depends on the database node. Due to an error on the database node, the application node may not be able to access information from the database node. Hence, an event may be detected on each of the database node and the application node. However, resolving the event on the database node necessarily resolves the event on the application node. Hence, a user need only analyze the event on the database node. The user need not additionally analyze the event on the application node. The event on the database node and the event on the application node may be grouped in the same cluster.

In an embodiment, a cluster 126 is a set of events that are related by time correlation and/or topological correlation. Two events are related by time correlation if the events occur within a threshold duration of time within each other. Two events that are time-correlated may also be referred to as having "event co-occurrence." Further, two events are related by topological correlation if the nodes associated with the events are within a threshold number of hops from each other. The number of hops between two nodes is determined based on a relationship repository 118. In an embodiment, a cluster 126 may include a particular event if the particular event is time-correlated with at least one event already in the cluster and the particular event is topologically-correlated with at least one event already in the cluster. As an example, a cluster may include a first event occurring a first node and a second event occurring on a second node. A third event may occur on a third node. The third event may be time-correlated with the first event. Additionally, the third event may be topologically-correlated with the second event. Hence, the third event may be added to the cluster.

Figure 2A:
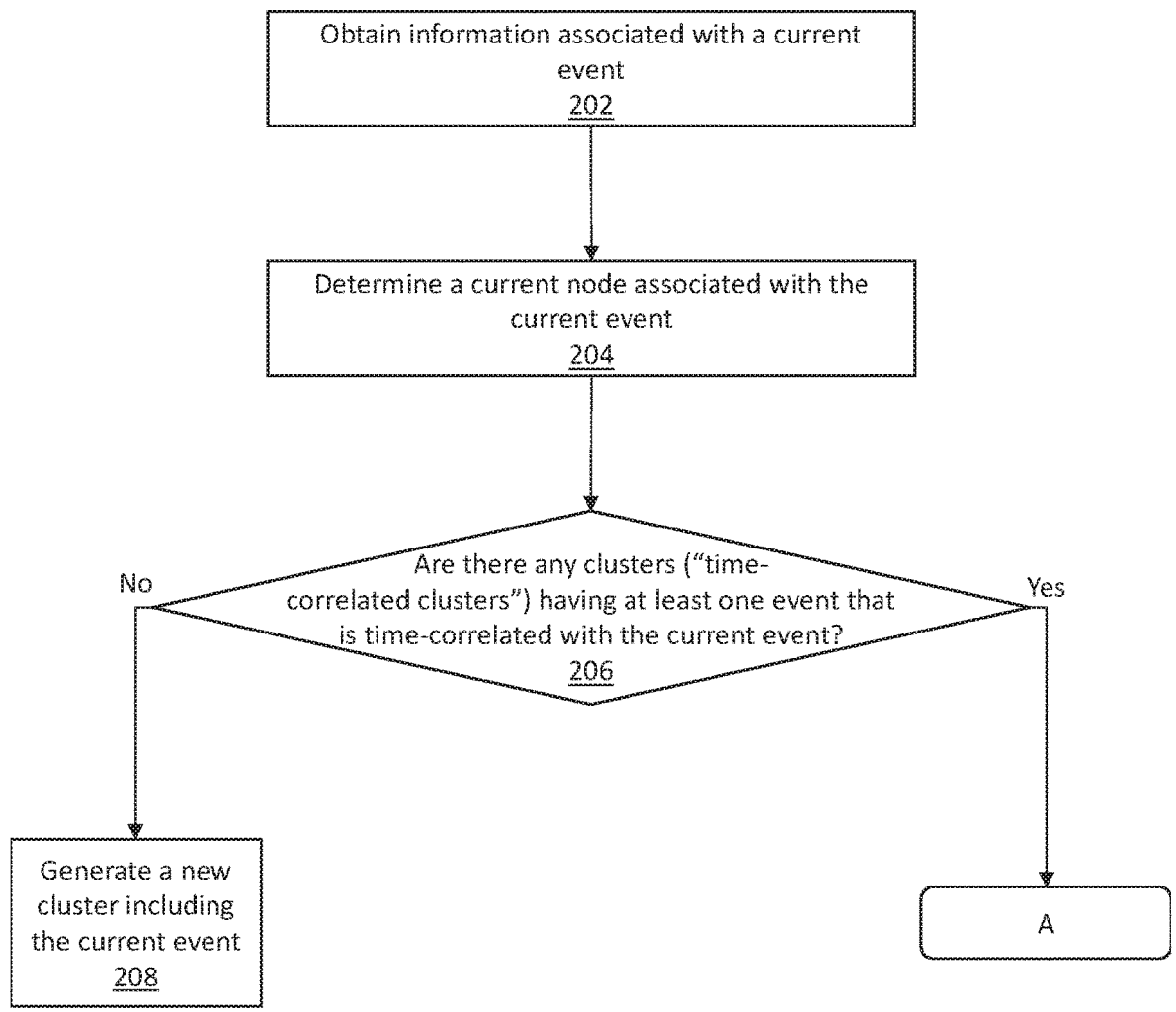
FIGS. 2A-B illustrate an example set of operations for using and updating topological relationships amongst a set of nodes in event clustering, in accordance with one or more embodiments.
Figure 2B:
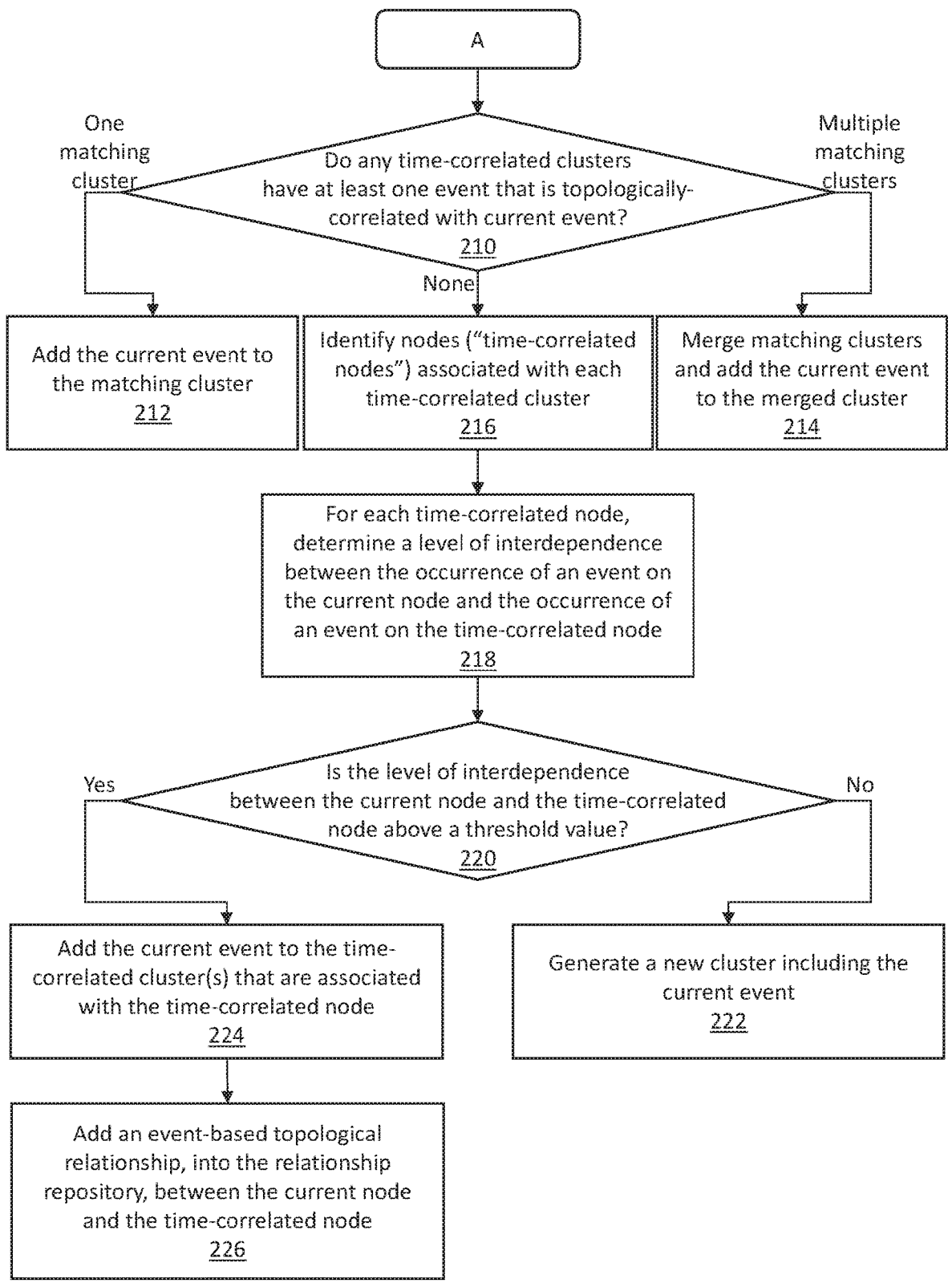

3. Using and Updating Topological Relationships Amongst a Set of Nodes in Event Clustering FIGS. 2A-B illustrate an example set of operations for using and updating topological relationships amongst a set of nodes in event clustering, in accordance with one or more embodiments. One or more operations illustrated in FIGS. 2A-B may be modified, rearranged, or omitted all together. Accordingly, the particular sequence of operations illustrated in FIGS. 2A-B should not be construed as limiting the scope of one or more embodiments.

One or more embodiments include obtaining information associated with a current event (Operation 202). Metrics associated with a set of nodes in a target computing system are monitored. A particular metric associated with a particular node satisfies a certain criteria. A current event is determined to have occurred. A notification of the current event is generated. The notification includes information associated with the current event, such as the node on which the current event occurred, the time at which the current event occurred, and the event type of the current event.

One or more embodiments include determining a current node associated with the current event (Operation 204). Based on the information associated with the current event obtained at Operation 202, a current node on which the event occurred is determined.

One or more embodiments include determining whether there are any clusters (referred to herein as "time-correlated cluster") having at least one event that is time-correlated with the current event (Operation 206). An existing set of clusters are identified. Each existing cluster is analyzed to determine whether the cluster includes at least one event that is time-correlated with the current event. As described above, two events are time-correlated if the two events occur within a threshold duration of time of each other. The threshold duration of time may be specified by a user and/or an application In an embodiment, for a given cluster, the most recent event is identified. The time at which the most recent event, in the cluster, occurred is determined. The time at which the current event occurred is determined. The time difference between the occurrence of the most recent event, in the cluster, and that of the current event is compared with a threshold duration of time. If the time difference is less than the threshold duration of time, then the two events are time-correlated. Hence, the cluster is identified as a time-correlated cluster. If the time difference is greater than the threshold duration of time, then the cluster is not a time-correlated cluster for the current event.

In an embodiment, for a given cluster, one or more events are analyzed until an event that is time-correlated with the current event is identified. If there is at least one event that is time-correlated with the current event, then the cluster is identified as a time-correlated cluster. If there are no events that are time-correlated with the current event, then the cluster is not a time-correlated cluster for the current event.

If there are no time-correlated clusters, then one or more embodiments include generating a new cluster including the current event (Operation 208). A new cluster is generated to include the current event. The new cluster includes only a single event, the current event, at this time. Subsequently, based on iterations of the operations of FIGS. 2A-B with respect to new events, zero, one, or more events may further be added to the new cluster. Information about the new cluster may be presented and/or transmitted via an interface. The information about the new cluster may indicate that the new cluster includes the current event. A user and/or an application obtaining the information about the new cluster from the interface may process the new cluster. The user and/or the application may analyze and/or resolve the events in the new cluster as a group. Analyzing and/or resolving the events improves performance and/or resolves errors of the target computing system. Based on the correlations amongst the events of a cluster, processing the events as a group may be more efficient than processing the events individually.

One or more embodiments include determining whether any time-correlated clusters have at least one event that is topologically-correlated with the current event (Operation 210). Each time-correlated cluster, identified at Operation 206, is analyzed to determine whether the cluster includes at least one event that is topologically-correlated with the current event. As described above, two events are topologically-correlated if the respective nodes associated the two events are within a threshold number of hops within each other according to a relationship repository. The threshold number of hops may be specified by a user and/or an application. A cluster that includes both (a) an event that is time-correlated with the current event and (b) an event that is topologically-correlated with the current event is referred to as a "matching cluster."

In an embodiment, for a given time-correlated cluster, one or more events are analyzed until an event that is topologically-correlated with the current event is identified. Respective nodes associated with one or more events are analyzed to determine whether the node is within a threshold number of hops from the current node. If there is an event that is topologically-correlated with the current event, then the cluster is identified as matching cluster. If there are no events that are topologically-correlated with the current event, then the cluster is not a matching cluster for the current event.

Referring to the relationship graph 119 of FIG. 1B as an example, a current event may occur on node 104b. A first time-correlated cluster, for the current event, may include a first event occurring on node 104d. A second time-correlated cluster, for the current event, may include a second event occurring on node 104e. A threshold number of hops for determining topological correlation may be one.

The second time-correlated cluster may be analyzed. The second event, within the second time-correlated cluster, may be analyzed to determine that the second event is associated with node 104e. Based on the relationship graph 119, there are two hops (that is, the event-based relationship 122a and the structural relationship 120c) between node 104e and node 104b. The number of hops between node 104e and node 104b is greater than the threshold of one. All other events of the second time-correlated cluster may also be analyzed and determined to be not topologically-correlated with the current event. Hence, the second time-correlated cluster is not a matching cluster for the current event.

The first time-correlated cluster may be analyzed. The first event, within the first time-correlated cluster, may be analyzed to determine the first event is associated with node 104d. Based on the relationship graph 119, there is one hop (that is, event-based relationship 122a) between node 104d and node 104b. The number of hops between node 104d and node 104b is within the threshold of one. Hence, the first time-correlated cluster is determined as a matching cluster for the current event.

If there is one matching cluster, then one or more embodiments include adding the current event to the matching cluster (Operation 212). The current event is added to the matching cluster. Information indicating the events of the matching cluster, including the current event, may be presented and/or transmitted via an interface. A user and/or an application obtaining the information about the matching cluster from the interface may process the matching cluster. The user and/or the application may analyze and/or resolve the events in the matching cluster as a group.

If there are multiple matching clusters, then one or more embodiments include merging the matching clusters and adding the current event to the merged cluster (Operation 214). The matching clusters are merged into a merged cluster. The merged cluster includes all the events of each matching cluster as well as the current event. Information indicating the events of the merged cluster, including the current event, may be presented and/or transmitted via an interface. A user and/or an application obtaining the information about the merged cluster from the interface may process the merged cluster. The user and/or the application may analyze and/or resolve the events in the merged cluster as a group.

If there are no matching clusters, then one or more embodiments include identifying nodes (referred to herein as "time-correlated nodes") associated with each time-correlated cluster (Operation 216). Each time-correlated cluster, identified at Operation 206, is analyzed. For a given time-correlated cluster, each event is analyzed to identify a node on which the event occurred. Each identified node (except for the current node and nodes that are already topologically-correlated with the current node) is referred to as a "time-correlated node" for the current event. Hence, a set of time-correlated nodes, for the current event, may be associated with one or more time-correlated clusters.

One or more embodiments include, for each time-correlated node, determining a level of interdependence between the occurrence of an event on the current node and the occurrence of an event on the time-correlated node (Operation 218). Each time-correlated node, identified at Operation 216, is analyzed. For each time-correlated node, a level of interdependence between the occurrence of an event on the current node and the occurrence of an event on the time-correlated node is determined. The level of interdependence may be determined based on various statistical models, probability models, and/or information theory models. Examples of models for determining a level of interdependence include mutual information, and/or correlation coefficient.

In an embodiment, a level of interdependence is determined using mutual information (MI). Mutual information is a measure of mutual dependence between two variables. Mutual information quantifies an "amount of information" obtained about one variable through another variable.

In an embodiment, a mutual information between an occurrence of an event on a current node and an occurrence of an event on a time-correlated node is based on:
(a) a probability, P(current node), of a cluster having an event on the current node; and
(b) a probability, P(current node|time-correlated node), of a cluster having an event on the current node and an event on the time-correlated node that is within a threshold duration of time from the event on the current node.

The mutual information is determined as:

$$\frac{P(\text{current node} \mid \text{time} - \text{correlated node})}{P(\text{current node})}.$$

As an example, an existing set of clusters may include:
(a) Cluster A: Event 1 on Node 1, Event 2 on Node 2, Event 3 on Node 3;
(b) Cluster B: Event 4 on Node 1, Event 5 on Node 4;
(c) Cluster C: Event 6 on Node 1, Event 7 on Node 2;
(d) Cluster D: Event 8 on Node 2, Event 9 on Node 4.

A current event may occur on Node 4. A time-correlated cluster for Node 4 may be Cluster A. Based on Cluster A, the time-correlated nodes are Node 1, Node 2, and Node 3.

The mutual information associated with Node 4 (the current node) and each of Node 1, Node 2, and Node 3 (the time-correlated nodes) may be determined.

Each mutual information is based on a probability, P(Node 4), of a cluster having an event on Node 4 (the current node). The number of clusters having at least one event on Node 4 is 2 (that is, Cluster B and Cluster D). The total number of clusters is 4. Hence, P(current node) is 2/4=0.5.

The mutual information associated with Node 4 and Node 1 is based on a probability, P(Node 4|Node 1), of a cluster having an event on Node 4 and an event on Node 1 that is within a threshold duration of time from the event on Node 4. Assume that Event 4 is within the threshold duration of time from Event 5. Then the number of clusters having an event on Node 4 and an event on Node 1 that is within the threshold duration of time from the event on Node 4 is 1 (that is, Cluster B). The total number of clusters is 4. Hence, P(Node 4|Node 1) is 1/4=0.25.

Therefore, the mutual information, $$\frac{P(\text{Node 4} \mid \text{Node 1})}{P(\text{Node 4})},$$

is 0.25/0.5=0.5.

The mutual information associated with Node 4 and Node 2 is based on a probability, P(Node 4|Node 2), of a cluster having an event on Node 4 and an event on Node 2 that is within a threshold duration of time from the event on Node 4. Assume that Event 8 is not within the threshold duration of time from Event 9. Then the number of clusters having an event on Node 4 and an event on Node 2 that is within the threshold duration of time from the event on Node 4 is 0. Hence, P(Node 4|Node 2) is 0.

Therefore, the mutual information, $$\frac{P(\text{Node 4} \mid \text{Node 2})}{P(\text{Node 4})},$$

is 0.

The mutual information associated with Node 4 and Node 3 is based on a probability, P(Node 4|Node 3), of a cluster having an event on Node 4 and an event on Node 3 that is within a threshold duration of time from the event on Node 4. The number of clusters having an event on Node 4 and an event on Node 3 that is within the threshold duration of time from the event on Node 4 is 0. Hence, P(Node 4|Node 3) is 0.

Therefore, the mutual information, $$\frac{P(\text{Node 4} \mid \text{Node 3})}{P(\text{Node 4})},$$

is 0.

Additional and/or alternative ways for determining a level of interdependence between an occurrence of an event on the current node and an occurrence of an event on a time-correlated node may be used.

One or more embodiments include determining whether the level of interdependence between the current node and the time-correlated node is above a threshold value (Operation 220). The respective level of interdependence, determined at Operation 118, for the current node and each time-correlated node is compared with a threshold value. The threshold value may be specified by a user and/or an application.

If the level of interdependence is not above the threshold value, then one or more embodiments include generating a new cluster including the current event (Operation 222). Embodiments and examples for generating a new cluster including the current event are described above with reference to Operation 208.

If the level of interdependence is above the threshold value, then one or more embodiments include adding the current event to the time-correlated cluster(s) that are associated with the time-correlated node (Operation 224). As described at Operation 220, the respective level of interdependence associated with the current node and each time-correlated node is analyzed. Each time-correlated node associated with a respective level of interdependence that is above the threshold value is identified. For each identified time-correlated node, one or more time-correlated clusters that include at least one event on the identified time-correlated node are identified. The current event is added to each of the identified time-correlated clusters.

Information about each cluster may be presented and/or transmitted via an interface. The information may indicate that one or more particular clusters include the current event. A user and/or an application obtaining the information about the clusters from the interface may process the clusters. The user and/or the application may analyze and/or resolve the events in a particular cluster as a group.

As an example, a current event may occur on Node 1. A set of time-correlated nodes for a current event may include Node 2, Node 3, and Node 4. A level of interdependence for an occurrence of an event on Node 1 (the current node) and an occurrence of Node 2 may be above a threshold value. A level of interdependence for an occurrence of an event on Node 1 and an occurrence of Node 3 may be lower than the threshold value. A level of interdependence for an occurrence of an event on Node 1 and an occurrence of Node 4 may be above the threshold value. Hence, Node 2 and Node 4 are identified as being associated with a respective level of interdependence that is above the threshold value.

Node 2 may be analyzed. Time-correlated clusters, for the current event, that include an event on Node 2 may be Cluster A and Cluster B. Hence, the current event is added to each of Cluster A and Cluster B.

Node 4 may be analyzed. Time-correlated clusters, for the current event, that include an event on Node 4 may be Cluster A and Cluster C. The current event was already added to Cluster A. The current event is further added to Cluster C.

One or more embodiments include adding an event-based topological relationship, into the relationship repository, between the current node and the time-correlated node (Operation 226). As described at Operation 220, the respective level of interdependence associated with the current node and each time-correlated node is analyzed. Each time-correlated node associated with a respective level of interdependence that is above the threshold value is identified. For each identified time-correlated node, an event-based topological relationship is added between the current node and the identified time-correlated node. The event-based topological relationship is added in the relationship repository.

Continuing the example from above, a current event has occurred on Node 1. Node 2 and Node 4 have been identified as being associated with a respective level of interdependence that is above the threshold value.

Hence, an event-based topological relationship is added between Node 1 and Node 2. Further, an event-based topological relationship is added between Node 1 and Node 4.

The event-based topological relationship added between the current node and the time-correlated node may indicate that the number of hops between the current node and the time-correlated node is 1.

Referring to the relationship graph 119 of FIG. 1B as an example, a current event may occur on node 104b. A time-correlated node for the current event may be node 104f. A threshold number of hops used for determining topological correlation may be two.

A level of interdependence between an occurrence of an event on node 104b and an occurrence of an event on node 104f may be above a threshold value. Hence, the current event may be added to each time-correlated cluster that is associated with node 104f. Moreover, an event-based topological relationship is added between node 104b and node 104f. The event-based topological relationship may indicate that there is a direct topological relationship between node 104b and node 104f. Hence, a number of hops between node 104b and node 104f may be one.

Alternatively, The event-based topological relationship added between the current node and the time-correlated node may indicate that the number of hops between the current node and the time-correlated node is equal to the threshold number of hops used for determining topological correlation at Operation 210.

Referring to the relationship graph 119 of FIG. 1B as an example, a current event may occur on node 104b. A time-correlated node for the current event may be node 104f. A threshold number of hops used for determining topological correlation may be two.

A level of interdependence between an occurrence of an event on node 104b and an occurrence of an event on node 104f may be above a threshold value. Hence, the current event may be added to each time-correlated cluster that is associated with node 104f. Moreover, an event-based topological relationship is added between node 104b and node 104f. The event-based topological relationship may indicate that a number of hops between node 104b and node 104f is equal to the threshold number of hops used for determining topological correlation. Hence, a number of hops between node 104b and node 104f may be two.

Hence, event information associated with the current event is used to update a relationship repository. The relationship repository is updated to include one or more new event-based topological relationships.

Subsequently, a new event may occur on a particular node. The operations of FIGS. 2A-B are iterated with respect to the new event. The operations of FIGS. 2A-B are iterated with respect to the new event using the updated relationship repository.

4. Example Embodiment

A detailed example is described below for purposes of clarity. Components and/or operations described below should be understood as one specific example which may not be applicable to certain embodiments. Accordingly, components and/or operations described below should not be construed as limiting the scope of any of the claims.

Figure 3A:
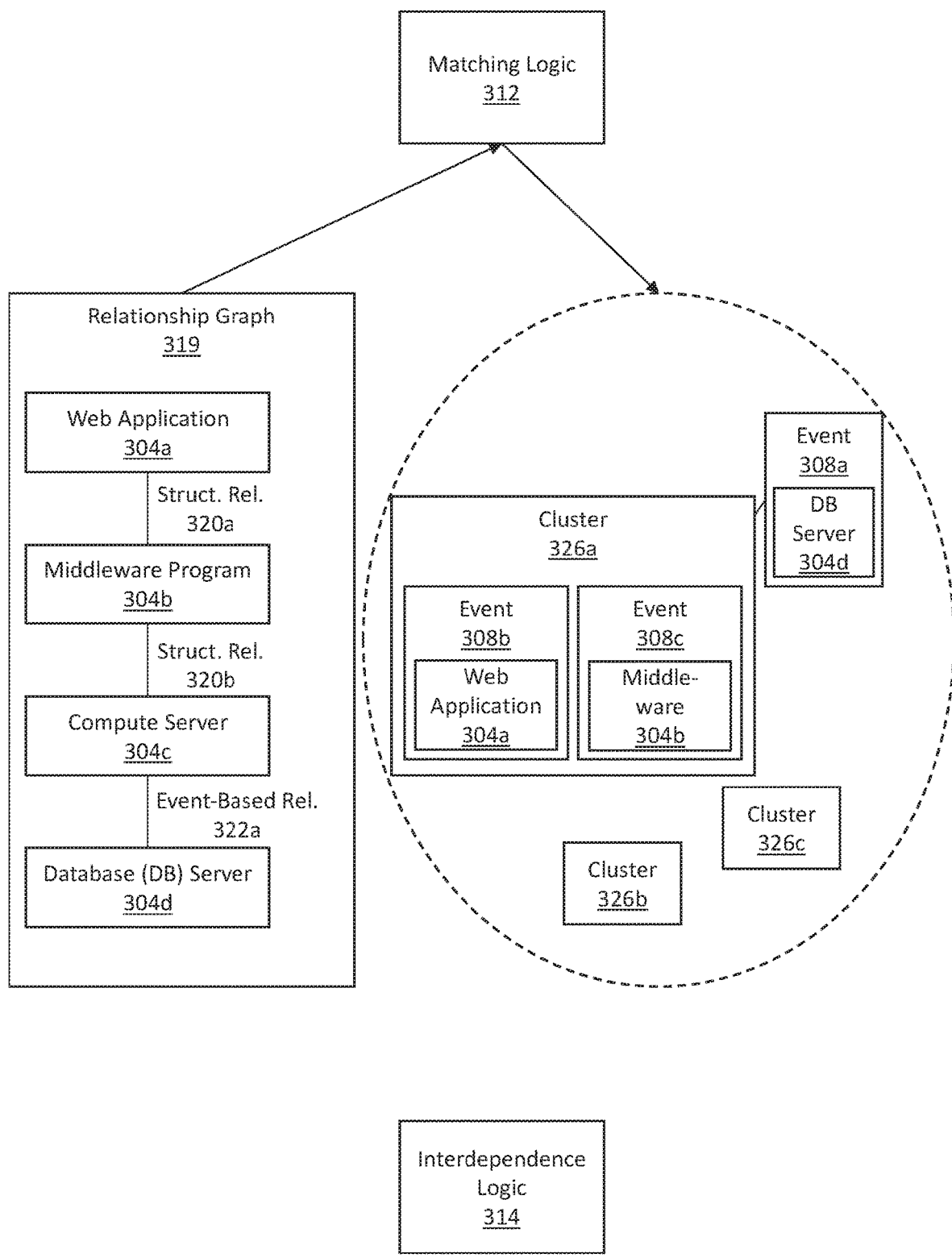
FIGS. 3A-B illustrate an example feedback loop for using and updating topological relationships amongst a set of nodes in event clustering, in accordance with one or more embodiments.
Figure 3B:
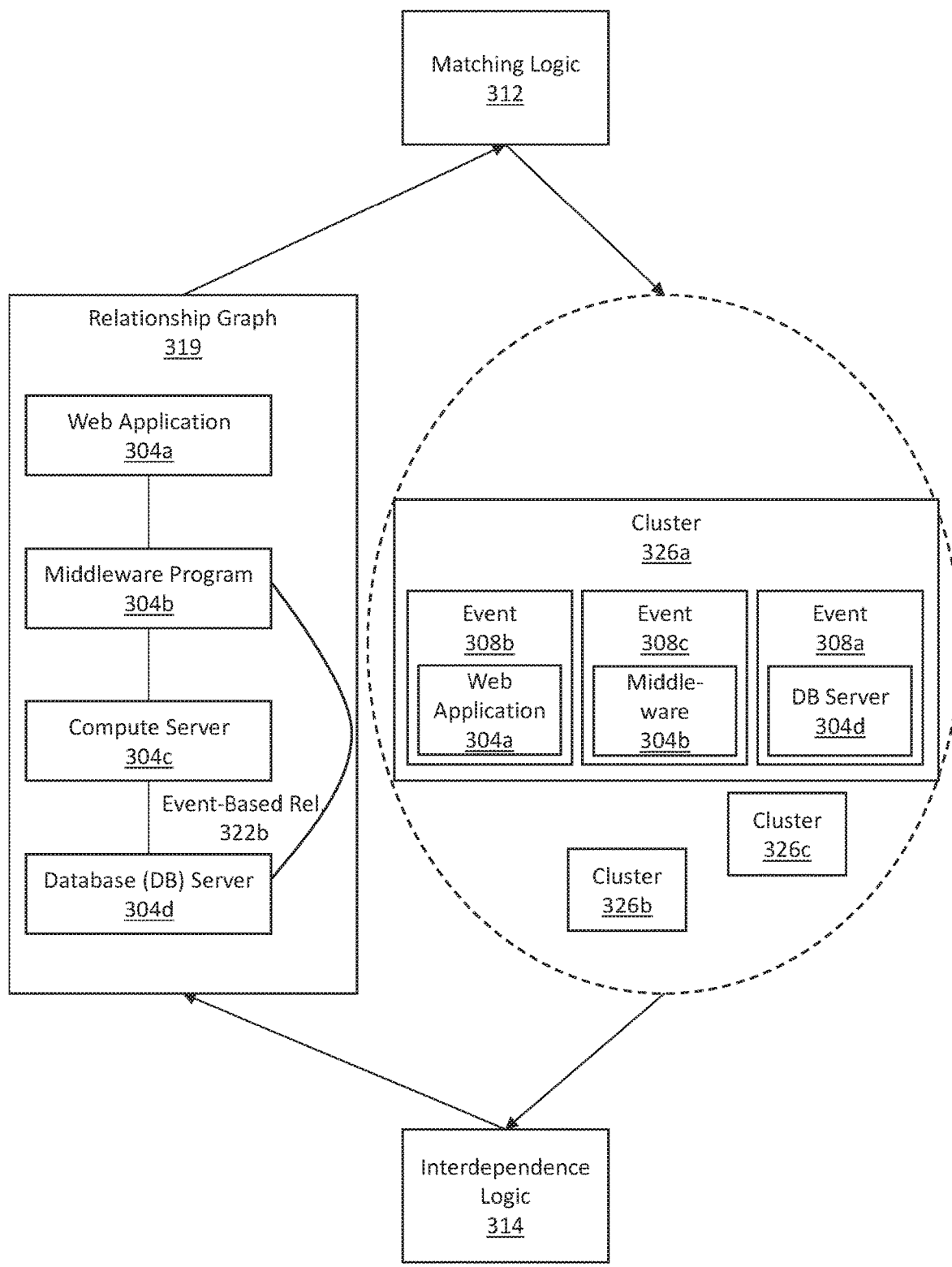

FIGS. 3A-B illustrate an example feedback loop for using and updating topological relationships amongst a set of nodes in event clustering, in accordance with one or more embodiments. As illustrated, FIGS. 3A-B include a relationship graph 319, a set of clusters 326a-c, matching logic 312, and interdependence logic 314.

Referring to FIG. 3A, a relationship graph 319 indicates an existing set of topological relationships. The relationship graph 319 includes various nodes, including a web application 304a, a middleware program 304b, a compute server 304c, and a database (DB) server 304d. A structural relationship 320a exists between web application 304a and middleware program 304b. A structural relationship 320b exists between middleware program 304b and compute server 304c. An event-based relationship 322a exists between compute server 304c and DB server 304d.

As an example, a configuration file of web application 304a may indicate that web application 304a is executed on middleware program 304b. Hence, a unidirectional structural topological relationship 320a may be determined to exist between web application 304a and middleware program 304b. Further, monitored network traffic may indicate that middleware program 304b and compute server 304c communicate with each other. Hence, a bidirectional structural topological relationship 320b may be determined to exist between middleware program 304b and compute server 304c. Further, the event-based relationship 322a between compute server 304c and DB server 304d may be determined based on previous analysis of events occurring on each of compute server 304c and DB server 304d.

A current event 308a may occur on DB server 304d. The current event 308a may, for example, indicate that a response time on the DB server 304d has exceeded a threshold value.

The relationship graph 319 is input into the matching logic 312. Applying the relationship graph 319, the matching logic 312 determines correlations between current event 308a and a set of clusters 326a-c. Specifically, the matching logic 312 determines whether any of cluster 326a-c includes both (a) an event that is time-correlated with event 308a and (b) an event that is topologically-correlated with event 308a based on the relationship graph 319. The matching logic 312 determines that no such clusters exist for event 308a.

In particular, cluster 326a includes event 308b occurring on web application 304a and event 308c occurring on middleware program 304b. Event 308b may occur within a threshold duration of time of current event 308a. Hence, the matching logic 312 determines that cluster 326a includes an event 308b that is time-correlated with current event 308a. Cluster 326a is a time-correlated cluster for current event 308a.

A number of hops used for determining topological correlation may be 1. The matching logic 312 determines a number of hops between the current node (DB server 304d) and each time-correlated node. Time-correlated nodes include the nodes associated with the time-correlated cluster 326a, which are web application 304a and middleware program 304b. A number of hops between DB server 304d and web application 304a is 3, which is above the threshold of 1. A number of hops between DB server 304d and middleware program 304b is 2, which is above the threshold of 1. Hence, the matching logic 312 determines that cluster 326a does not include any event that is topologically-correlated with current event 308a.

The clustering information determined above, by the matching logic 312, is input into the interdependence logic 314. Applying the clustering information, the interdependence logic 314 determines a respective level of interdependence for the current node (DB server 304d) and each time-correlated nodes (web application 304a and middleware program 304b). For example, a value of mutual information may be computed between the nodes. A level of interdependence for DB server 304d and web application 304a may be below the threshold value. A level of interdependence for DB server 304d and middleware program 304b may be above the threshold value.

Referring to FIG. 3B, responsive to determining that the level of interdependence for DB server 304d and middleware program 304b is above the threshold value, the interdependence logic 314 adds current event 308a to cluster 326a. Further the interdependence logic 314 updates the relationship graph 319. Specifically the interdependence logic 314 adds a direct event-based relationship 322b between DB server 304d and middleware program 304b. The event-based relationship 322b indicates that there is one hop between DB server 304d and middleware program 304b.

Subsequently, the new relationship graph 319, including the event-based relationship 322b, is used for determining clustering for one or more new events. The matching logic 312 applies the new relationship graph 319 to determine correlations between new events and the set of clusters 326a-c.

5. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

6. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, cause performance of operations comprising:
    identifying a plurality of events that occur on a set of nodes in a computing environment;
    determining a first cluster of related events, from the plurality of events, based on an existing set of topological relationships associated with the set of nodes;
    determining that there is event co-occurrence between (a) one or more events of the first cluster of related events and (b) a first event that is not within the first cluster of related events;
    based at least on the event co-occurrence between (a) the one or more events of the first cluster of related events and (b) the first event:
        determining an event-based topological relationship between (a) a first node, of the set of nodes, that is associated with at least one event of the first cluster of related events and (b) a second node, of the set of nodes, that is associated with the first event but not associated with any event of the first cluster of related events;
    identifying a second event that is associated with the first node;

identifying a third event, not already within the plurality of events, that is associated with the second node; and
based at least on the event-based topological relationship: clustering the second event and the third event into a second cluster of related events.

2. The medium of claim 1, wherein:
the operations further comprise:
    determining a level of interdependence between occurrence of events on the first node and occurrence of events on the second node;
    determining that the level of interdependence is above a threshold value; and
    determining the event-based topological relationship between the first node and the second node is further based on determining that the level of interdependence is above the threshold value.

3. The medium of claim 2, wherein determining the level of interdependence comprises:
    determining a first probability of a cluster having a fourth event on the second node;
    determining a second probability of a cluster having both (a) a fifth on the second node and (b) a sixth event on the first node that is within a threshold duration of time from the fifth event on the second node; and
    dividing the second probability by the first probability to obtain the level of interdependence.

4. The medium of claim 1, wherein:
the operations further comprise: determining that the one or more events of the first cluster of related events and the first event satisfy a statistical criteria; and
    determining the event-based topological relationship between the first node and the second node is further based on determining that the one or more events of the first cluster of related events and the first event satisfy the statistical criteria.

5. The medium of claim 1, wherein the operations further comprise:
    adding the event-based topological relationship between the first node and the second node to the existing set of topological relationships.

6. The medium of claim 1, wherein the existing set of topological relationships includes:
    a topological relationship that is determined based on one or more configuration files associated with one or more of the set of nodes.

7. The medium of claim 1, wherein the existing set of topological relationships includes:
    a topological relationship that is specified via user input.

8. The medium of claim 1, wherein identifying the first cluster of related events based on the existing set of topological relationships associated with the set of nodes comprises:
    determining that a fourth event and a fifth event occur within a threshold duration of time of each other;
    determining that a third node, on which the fourth event occurs, and a fourth node, on which the fifth event occurs, are within a threshold number of hops from each other based on the existing set of topological relationships; and
    determining that the fourth event and the fifth event are within the first cluster of related events.

9. The medium of claim 1, wherein the operations further comprise:
    based at least on the event co-occurrence between (a) the one or more events of the first cluster of related events and (b) the first event: adding the first event to the first cluster of related events.

10. The medium of claim 1, wherein the first cluster of related events and the second cluster of related events are different.

11. The medium of claim 1, wherein the first cluster of related events is same as the second cluster of related events.

12. The medium of claim 1, wherein the operations further comprise:
    presenting, at a user interface, information associated with the second cluster of related events, wherein the information associated with the second cluster of related events indicates that the second cluster of related events includes the second event and the third event.

13. The medium of claim 1, wherein the operations further comprise:
    responsive to determining that the second cluster of related events includes the second event and the third event: selecting the second event for analysis without selecting the third event for analysis.

14. The medium of claim 1, wherein the operations further comprise:
    determining that the third event, within the second cluster of related events, has been resolved;
    responsive to determining that the third event has been resolved: indicating that the second event, within the second cluster of related events, is also resolved.

15. A method, comprising:
    identifying a plurality of events that occur on a set of nodes in a computing environment;
    determining a first cluster of related events, from the plurality of events, based on an existing set of topological relationships associated with the set of nodes;
    determining that there is event co-occurrence between (a) one or more events of the first cluster of related events and (b) a first event that is not within the first cluster of related events;
    based at least on the event co-occurrence between (a) the one or more events of the first cluster of related events and (b) the first event:
        determining an event-based topological relationship between (a) a first node, of the set of nodes, that is associated with at least one event of the first cluster of related events and (b) a second node, of the set of nodes, that is associated with the first event but not associated with any event of the first cluster of related events;
    identifying a second event that is associated with the first node;
    identifying a third event, not already within the plurality of events, that is associated with the second node; and
    based at least on the event-based topological relationship: clustering the second event and the third event into a second cluster of related events;
    wherein the method is performed by at least one device including a hardware processor.

16. The method of claim 15, further comprising:
    determining a level of interdependence between occurrence of events on the first node and occurrence of events on the second node;
    determining that the level of interdependence is above a threshold value;
    wherein determining the event-based topological relationship between the first node and the second node is further based on determining that the level of interdependence is above the threshold value.

17. The method of claim 16, wherein determining the level of interdependence comprises:

determining a first probability of a cluster having a fourth event on the second node;

determining a second probability of a cluster having both (a) a fifth on the second node and (b) a sixth event on the first node that is within a threshold duration of time from the fifth event on the second node; and dividing the second probability by the first probability to obtain the level of interdependence.

18. A system, comprising:

at least one device including a hardware processor; and the system being configured to perform operations comprising:

identifying a plurality of events that occur on a set of nodes in a computing environment;

determining a first cluster of related events, from the plurality of events, based on an existing set of topological relationships associated with the set of nodes;

determining that there is event co-occurrence between (a) one or more events of the first cluster of related events and (b) a first event that is not within the first cluster of related events;

based at least on the event co-occurrence between (a) the one or more events of the first cluster of related events and (b) the first event:

determining an event-based topological relationship between (a) a first node, of the set of nodes, that is associated with at least one event of the first cluster of related events and (b) a second node, of the set of nodes, that is associated with the first event but not associated with any event of the first cluster of related events;

identifying a second event that is associated with the first node;

identifying a third event, not already within the plurality of events, that is associated with the second node; and based at least on the event-based topological relationship: clustering the second event and the third event into a second cluster of related events.

19. The system of claim 18, wherein:

the operations further comprise:

determining a level of interdependence between occurrence of events on the first node and occurrence of events on the second node;

determining that the level of interdependence is above a threshold value; and determining the event-based topological relationship between the first node and the second node is further based on determining that the level of interdependence is above the threshold value.

20. The system of claim 19, wherein determining the level of interdependence comprises:

determining a first probability of a cluster having a fourth event on the second node;

determining a second probability of a cluster having both (a) a fifth on the second node and (b) a sixth event on the first node that is within a threshold duration of time from the fifth event on the second node; and dividing the second probability by the first probability to obtain the level of interdependence.

\* \* \* \* \*